(12) United States Patent
Pellegrini et al.

(10) Patent No.: US 10,417,141 B2
(45) Date of Patent: Sep. 17, 2019

(54) METHOD AND APPARATUS FOR HARDWARE MANAGEMENT OF MULTIPLE MEMORY POOLS

(71) Applicant: ARM Ltd, Cambridge (GB)

(72) Inventors: Andrea Pellegrini, Austin, TX (US); Kshitij Sudan, Austin, TX (US); Ali Saidi, Austin, TX (US); Wendy Arnott Elsasser, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/601,541

(22) Filed: May 22, 2017

(65) Prior Publication Data

US 2018/0336142 A1 Nov. 22, 2018

(51) Int. Cl.
| | |
|---|---|
| *G06F 12/00* | (2006.01) |
| *G06F 12/128* | (2016.01) |
| *G06F 12/0808* | (2016.01) |
| *G06F 12/1027* | (2016.01) |
| *G06F 12/1009* | (2016.01) |
| *G06F 12/12* | (2016.01) |

(52) U.S. Cl.
CPC ........ *G06F 12/128* (2013.01); *G06F 12/0808* (2013.01); *G06F 12/1009* (2013.01); *G06F 12/1027* (2013.01); *G06F 12/12* (2013.01); *G06F 2212/621* (2013.01); *G06F 2212/65* (2013.01); *G06F 2212/68* (2013.01)

(58) Field of Classification Search
CPC .............. G06F 12/128; G06F 12/0808; G06F 12/1027; G06F 12/1009; G06F 12/12; G06F 2212/621; G06F 2212/65; G06F 2212/68
See application file for complete search history.

(56) References Cited

U.S. PATENT DOCUMENTS

| | | | |
|---|---|---|---|
| 2003/0115035 A1* | 6/2003 | Kulshreshtha | G06F 17/5022 703/19 |
| 2004/0030847 A1* | 2/2004 | Tremaine | G06F 12/023 711/154 |
| 2015/0089126 A1* | 3/2015 | Subramoney | G06F 12/0895 711/105 |
| 2015/0143037 A1* | 5/2015 | Smith | G06F 3/061 711/103 |
| 2016/0231933 A1* | 8/2016 | Loh | G06F 3/0604 |

* cited by examiner

*Primary Examiner* — Kalpit Parikh
(74) *Attorney, Agent, or Firm* — Leveque IP Law, P.C.

(57) ABSTRACT

A data processing system for managing at least first and second memories includes a caching manager and a translation lookaside buffer (TLB). The caching manager comprises hardware configured to transfer data between the memories and is configured to monitor accesses to the first memory by a processing device and transfer data in a frequently accessed region at a first address in the first memory to a region at a second address in the second memory. When the data has not been transferred to the second memory, the TLB stores a virtual address and a corresponding address in the first memory. However, when the data has been transferred to the second memory, the TLB stores the virtual address and a corresponding address in the second memory. A mapping between the addresses in the first and second memories may be stored in a shadow-address table.

18 Claims, 5 Drawing Sheets

FIG. 2

TRANSLATION LOOKASIDE BUFFER TABLE (200)

| VA | SCM ADDR. | FLAGS | IN DRAM | ACCESS COUNT | DRAM ADDR. |
|---|---|---|---|---|---|
| AAAA | PPPP | ... | Y | # | XXXX |
| ... | ... | ... | ... | ... | ... |
| BBBB | QQQQ | ... | Y | # | YYYY |
| CCCC | RRRR | ... | N | # | -- |

SHADOW-ADDRESS TABLE (300)

| SCM ADDR. | FLAGS | IN DRAM | ACCESS COUNT | DRAM ADDR. |
|---|---|---|---|---|
| PPPP | ... | Y | # | XXXX |
| ... | ... | ... | ... | ... |
| QQQQ | ... | Y | # | YYYY |
| RRRR | ... | N | # | -- |

302, 304, 306, 310, 308

METHOD AND APPARATUS FOR HARDWARE MANAGEMENT OF MULTIPLE MEMORY POOLS

BACKGROUND

A data processing system may include several different types of memory. For example, a system may include relatively small amounts of high speed, high cost memory and larger amounts of slower, cheaper memory. These memories might be implemented using different technologies. During operation of a data processing system, data may be moved between the different types of memory to improve performance of the system.

Management of data movement between the different types of memory may be performed using user software, an operating system (OS), hardware, or a combination thereof.

BRIEF DESCRIPTION OF THE DRAWINGS

FIG. 2 shows an augmented table of a translation lookaside buffer (TLB), consistent with embodiments of the disclosure.

FIG. 3 shows a shadow-address table, consistent with embodiments of the disclosure.

DETAILED DESCRIPTION OF THE EMBODIMENTS

Figure 1:
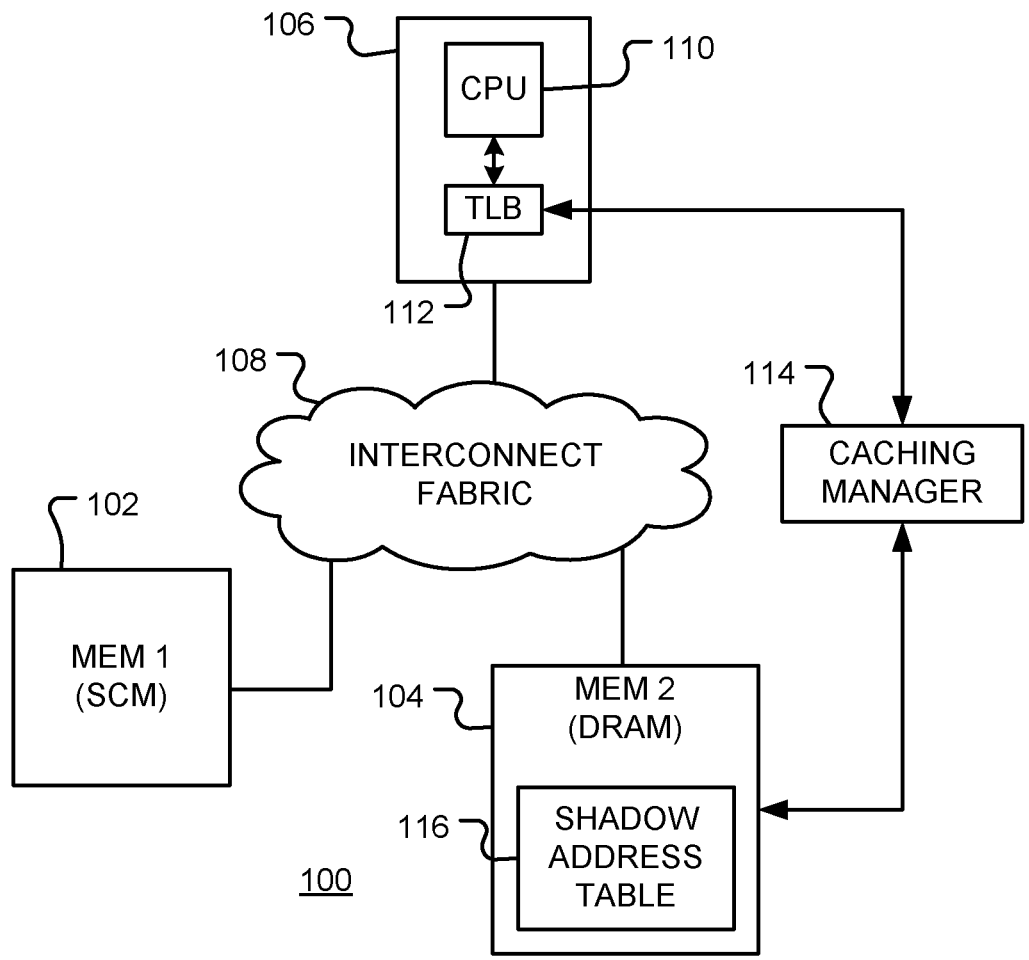
FIG. 1 shows a data processing system consistent with certain embodiments of the disclosure.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The present disclosure relates to the management of multiple memory pools in the same data processing system, where at least some of the memory pools use different memory technologies. Automatic movement of data is provided between the memory pools. This data movement is transparent to application software or operating system software, and is managed by the hardware. Data is moved between the memory pools to utilize the desirable properties of a given memory technology while mitigating its undesirable characteristics.

In accordance with an embodiment, data movement between pools of memory is achieved via extensions to a translation lookaside buffer (TLB) and the use of a hardware agent that will be referred to herein as a 'caching manager' or 'caching agent'. The caching agent is implemented in hardware and may be part of an integrated circuit having additional functions. The caching agent may be synthesized from a netlist or hardware description language (HDL) representation, for example.

Example systems where a caching manager may be used include a data processing system having a Dynamic Random Access Memory (DRAM) based cache for a Phase-Change Memory (PCM) based main-memory system, and a data processing system having a High Bandwidth Memory (HBM) cache for a DRAM-based main-memory.

The method and apparatus are described below with reference to an example system in which a main memory sub-system includes two pools of memory. However, the method is extensible to any arbitrary number of memory pools.

An example data processing system 100 consistent with certain embodiments is shown in FIG. 1. System 100 includes first or primary memory pool 102 and second or secondary memory pool 104. In this example, the first memory pool consists of slow, high density, low cost, limited endurance, persistent Storage Class Memory (SCM) (such as Phase-Change Memory (PCM), Flash memory, Resistive Random Access Memory (RRAM), etc.). The second memory pool consists of fast, lower capacity, high cost, high endurance, volatile memory (e.g., DRAM, HBM, etc.). These two pools may be assigned non-overlapping system address ranges. The DRAM address space is completely hardware-managed and the BIOS or system firmware only exposes the SCM memory range to the Operating System (OS). Effectively, the DRAM address range is hidden from the OS and no OS software intervention is needed.

The memory pools are accessed by processing device 106 via an interconnect fabric 108. System 100 may be implemented as a system on a chip, for example, or as two or more connected sub-systems. Processing device 106 includes central processing unit (CPU) or core 110, or similar processing element. Core 110 may execute one or more threads of a process under control of an operating system. The process may utilize virtual memory addresses allocated via an operating system (OS). Translation lookaside buffer (TLB) 112 is a high speed memory containing a lookup table that maps virtual memory addresses to corresponding physical memory addresses. Data may be stored in one or more caches or in a main memory, for example. Thus, TLB 112 is used to store information concerning the physical location of data associated with a particular virtual address and may indicate, for example, whether or not the corresponding physical page is stored in a cache. The data processing may have multiple cores 110 and multiple memories. Interconnect fabric 108 may be a coherent interconnect fabric that keeps track of copies of data stored at multiple memory locations.

The following section describes an embodiment in which data transfer between a SCM and a DRAM cache is managed without OS or software intervention.

In accordance with a first aspect of the disclosure, a translation lookaside buffer (TLB) is augmented to store information concerning where a physical page is stored. In one embodiment, for example, the TLB is augmented to indicate whether a physical page is stored in the cache (DRAM), or in the SCM.

Caching manager 114 interacts with one or more TLBs in the system to determine which pages are eligible for DRAM caching. This may be based on their access frequency, for example. Caching manager 114 comprises a hardware element and may be implemented, for example, as a finite state machine (FSM), a small programmable device or custom logic.

In the example embodiment, the caching manager handles DRAM cache lookups and replacements, initiates the data transfers between SCM and DRAM, and maintains the information used by the system to route memory requests to the correct memory pool.

FIG. 1 shows a single DRAM caching manager 114; however a system could partition the DRAM space into multiple memory regions and assign a different caching manager to each of them. For example, a home node may be provided for each memory range, with one caching manager allocated per home node.

In some embodiments, caching manager 114 maintains all the information about the cached pages in a table 116 in DRAM. Table 116 is referred to herein as a shadow-address table and may be indexed, for example, through a portion of the SCM physical page address.

FIG. 2 shows an augmented table 200 of a TLB in accordance with embodiments of the disclosure. Augmented table 200 is indexed by virtual addresses in column 202. The virtual addresses may be used by a processor. Augmented table 200 may be configured as a content addressable memory (CAM) for example. Column 204 stores associated physical addresses in the first (SCM) memory pool. Column 206 stores flags associated with the stored data (such as the coherency state, validity state, or whether a region is blocked, for example). Column 208 contains location flags that indicate if the data at the address is stored in a secondary memory pool (such as the DRAM pool). Column 208 may be implemented as a bit field with one bit for each secondary memory pool. If data is stored in secondary memory pool (as indicated by the 'Y' entry in the example shown), the address in the secondary memory is stored in column 210. Additionally, column 212 is used to store an access count that indicates the number of times a particular address (or address range) has been accessed by the processor, either in total or during some time interval.

When the core requests a memory access (at a virtual address), the TLB is queried to determine the physical address (which may be in the primary or secondary memory pool) and a corresponding request, using that address, is passed to the interconnect fabric.

In some embodiments, the caching manager maintains all the information about the cached pages in a table in DRAM. This table is referred to herein as a shadow-address table and may be indexed, for example, through a portion of the SCM physical page address. The shadow-address table may be organized as multiple-levels, or as a single flat structure. A flat structure might be optimal for systems where the DRAM caching manager handles only pages of the same size. This is similar to the methods used for maintaining the virtual-to-physical address mapping in page-tables by the operating system. When a shadow address table is used, the TLB need only store the secondary memory address or the primary memory address, but not both, since the mapping is maintained in shadow-address table. Additionally, flag 208 may be unnecessary when address ranges are non-overlapping and the location may be determined from the physical address.

An example shadow-address table 300 is shown in FIG. 3. Referring to FIG. 3, shadow-address table 300 includes column 302 that stores a primary (SCM in this example) memory address and column 304 that stores flags associated with the stored data. Column 306 contains location flags that indicate if the data at the address is stored in a secondary memory pool (such as the DRAM pool). Column 306 may be implemented as a bit field with one bit for each secondary memory pool. If data is stored in secondary memory pool (as indicated by the 'Y' entry in the example shown), the address in the secondary memory is stored in column 308. Additionally, column 310 is used to store an access count that indicates the number of times a particular address (or address range) has been accessed by the processor. The access count may be read by the caching manager from the augmented TLB table described above.

Shadow-address table 300 may contain more entries than the TLB table, since it is may be stored in the secondary memory, which is typically much larger than the size of the TLB table.

In operation, the caching manager issues requests to transfer pages from the SCM to DRAM (when caching a page) and from DRAM to SCM (when evicting a page from the DRAM cache). While page sized data chunks are described here, it is noted that data may be managed in different sized chunks. For example, a page may be composed of $2^N$ chunks. When a page transfer is fully completed, it updates the shadow-address table in the DRAM and sets a special flag bit (stored in column 208 in FIG. 2, for example) in the TLB entries. The flag bit indicates whether subsequent memory accesses to the associated page or address range should be redirected—either to the DRAM cache or the SCM in this example.

In one embodiment, instead of searching and updating all the distributed TLB entries after a page transfer, the current TLB entries for the pages that have been transferred are invalidated. Upon subsequent TLB fill requests, a special flag is set for that TLB entry to signify that the data resides in the DRAM cache. This flag is maintained by the TLB hardware and may not be architecturally visible.

To ensure that all cached pages are accounted for, a TLB fill operation may look up the shadow-address table to know whether the page is present in DRAM and to retrieve its address. For each page cached in the DRAM, along with the SCM address (which is the address programmed by software in the page tables), the TLB stores the information needed to address the page in DRAM.

Keeping Track of Cached Pages

In one embodiment, a flag is stored denoting whether a page is stored in the DRAM cache in the leaf entry in the page table structure. During a TLB fill operation, the flag indicates that the caching agent should be instructed to fetch the proper address from the shadow table in DRAM. If this information cannot be saved, a TLB fill operation may check whether the final address of the page that is about to be inserted in the TLB is already present in the DRAM cache. This is achieved by the caching manager by looking up the shadow-address table in the DRAM.

When a page is transferred from SCM to DRAM, the DRAM updates all TLBs that could store a translation for the transferred page. Alternatively, the TLB may be invalidated and the system allowed filling the TLB with the correct information.

The shadow-address table in the DRAM cache may be updated when the operating system deallocates a page from the process/application memory. One processor may cause the TLBs on other processors to be flushed using a TLB 'shoot-down' operation. The caching manager can use TLB 'shoot-downs' as a trigger to remove the associated entries from the shadow-address table.

Counters and Heuristics to Manage the DRAM Cache

In order to enable the caching manager to make the right decision on which pages should be cached in DRAM, the TLBs need to provide current information regarding page utilization. In some embodiments this is achieved by adding counters to each TLB entry to monitor access frequency. Separate access frequencies counters may be provided for read and write accesses, so that the system can identify which pages require large number of updates. A large number of updates may affect the durability of a memory pool.

Access frequency may be forwarded to the caching manager periodically at defined intervals, whenever the counters reach a certain threshold, or in response to a request from the caching manager. The caching manager aggregates this information by using logic to accumulate/add access counts for a given virtual address from TLB entries co-located with each core. This information may be collated at the operating system page granularity, or other granularities suitable for efficiently managing different memory pools. These access counts are then used to populate larger counter structures stored in its DRAM table which it then uses to decide when and which pages should be transferred between DRAM and SCM. This functionality may be included as part of the caching manager's logic.

Additionally, the caching manager may retrieve information relating to data access pattern in the system-cache by using the system-cache activity counters, if such are available. This information may be used to decide what pages need to be transferred from SCM to DRAM (and vice versa). Other methods of determining frequently accessed pages will be apparent to those of ordinary skill in the art without departing from this disclosure.

Figure 4:
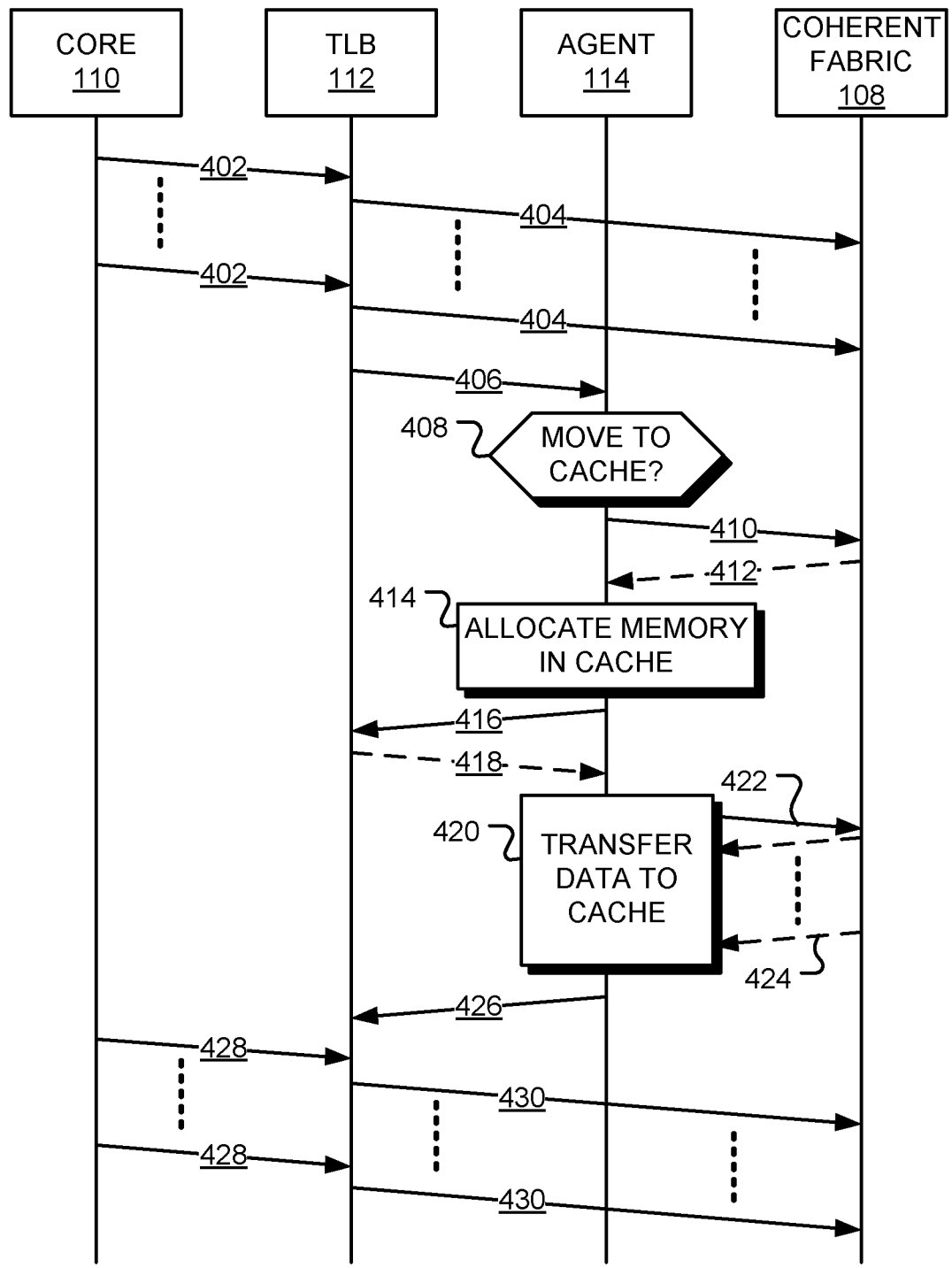
FIG. 4 is a signal flow chart of a method for managing multiple memory pools in a data processing system, in accordance with embodiments of the disclosure.

FIG. 4 is a signal flow chart 400 of a method for managing multiple memory pools in a data processing system, in accordance with some embodiments. In this example, the memory pools include a primary memory (such as a SCM) and a secondary memory (such as DRAM cache), but the process may be applied to other memory combinations. Initially, a processor 110 issues memory access requests 402 for data associated with a virtual address. The requests may be 'load', 'store' or 'fetch' requests, for example. A translation look-aside buffer (TLB) 112 is used to determine a physical address associated with the virtual address and a request 404 for data associated with the physical address is issued. Initially, the data is stored in the primary memory. This request may be passed to a coherent interconnect fabric 108 or some other data retrieval hardware. The data is retrieved and returned to the core (this action is omitted from the figure). A counter in the TLB is updated with each memory access request. The counter values are passed to caching agent 114 in message 406. Message 406 may be sent, for example, at regular intervals, in response to a request from the caching agent, or when the counter value exceeds a threshold value. At 408, caching agent 114 determines if frequently accessed data should be copied to the cache memory to enable faster access. If so, the caching agent accesses the shadow-address table at 410, by sending message 410 to interconnect fabric 108 and receiving response message 412, to determine if the memory has already been copied to the cache or if the shadow-address table is to be updated. If the data is not already in the cache, caching agent 114 allocates memory in the cache for the data to be copied at 414. The mapping from primary to secondary memory is recorded in the shadow-address table. Caching agent 114 then sends message 416 to TLB 112 to update the TLB. Message 416 indicates that the data is about to be copied, and that accesses should be controlled or restricted until the process is complete. Optionally, an acknowledgement or other response message 418 is returned to the caching agent. At 420, the data is copied from the primary memory to the cache. This may be achieved by sending message 422 to coherent interconnect fabric 108. One or more messages 424 may be returned to indicate the status of the transfer. When the transfer is complete, the caching agent sends message 426 to update the TLB to indicate that the data may now be accessed in the cache. The address in the cache is stored in the TLB. A flag in the TLB may be updated to indicate that the address is available in the cache and/or that the data is not in the process of being transferred. When new memory access requests 428 for data associated with the virtual address are generated by core 110, the translation look-aside buffer (TLB) 112 again provides the physical address associated with the virtual address and sends request 430 for data associated with the physical address. However, the physical address will now correspond to an address in the cache or secondary memory. Interconnect fabric 108 may determine the appropriate target for each request from the physical address provided, or the requests 430 may indicate the target.

When data is copied from a SCM primary memory to a DRAM cache, space is allocated in the DRAM cache to enable pages (or other sized memory chunks) to be migrated from the primary memory to the secondary memory, that is, from SCM to DRAM in this case. As described above, the caching manager monitors the access frequency counters either collated from the TLB entries, or stored in the shadow-address table to determine which pages should reside in DRAM cache and which pages should be evicted from DRAM and made resident in SCM. When the caching manager determines that it would be beneficial to cache a page in DRAM, it initiates the following routine:

a. Find a free block of memory in DRAM and retrieve its address;
b. Flush the data in on-chip caches corresponding to the page in SCM being migrated to DRAM, possibly using cache flush instructions.
c. Copy the necessary data from SCM to DRAM;
d. Broadcast to all TLBs the information that this page is now stored in DRAM. To achieve this, the DRAM caching manager may issue TLB shutdown instructions for migrated pages. Subsequent TLB fill operations will look up the shadow-address table in the DRAM and include appropriate bits in the TLB to determine the DRAM address of the page.

Only when this sequence of operations is successfully completed is all accesses to this page are directed to DRAM instead of the SCM.

In order to avoid data inconsistency (or data loss), accesses to memory blocks that are currently transferring between the two memories may be handled by one of the three possible methods:

a. The caching manager hardware aborting and repeating the entire page transfer at a later time,
b. Marking the transferring page as "migrating" (as discussed above) and clearing this flag only when the transfer is completed and all data is safely committed to the correct address location. This mechanism would be transparent to the software. It would be implemented solely in hardware and would effectively delay access to a TLB entry until the transfer completes. From a software standpoint, this procedure would be very similar to a guest OS suffering a fault in a Virtual Machine Monitor (VMM) page table, since the guest OS has no knowledge or visibility of the VMM-managed page tables (in this case the DRAM managed by the caching manager).
c. Limiting the number of stores in flight and temporarily make the DRAM caching manager the home node for the page that is being transferred. The DRAM caching manager can cache/merge these updates as needed until the data transfer is completed.

Figure 5:
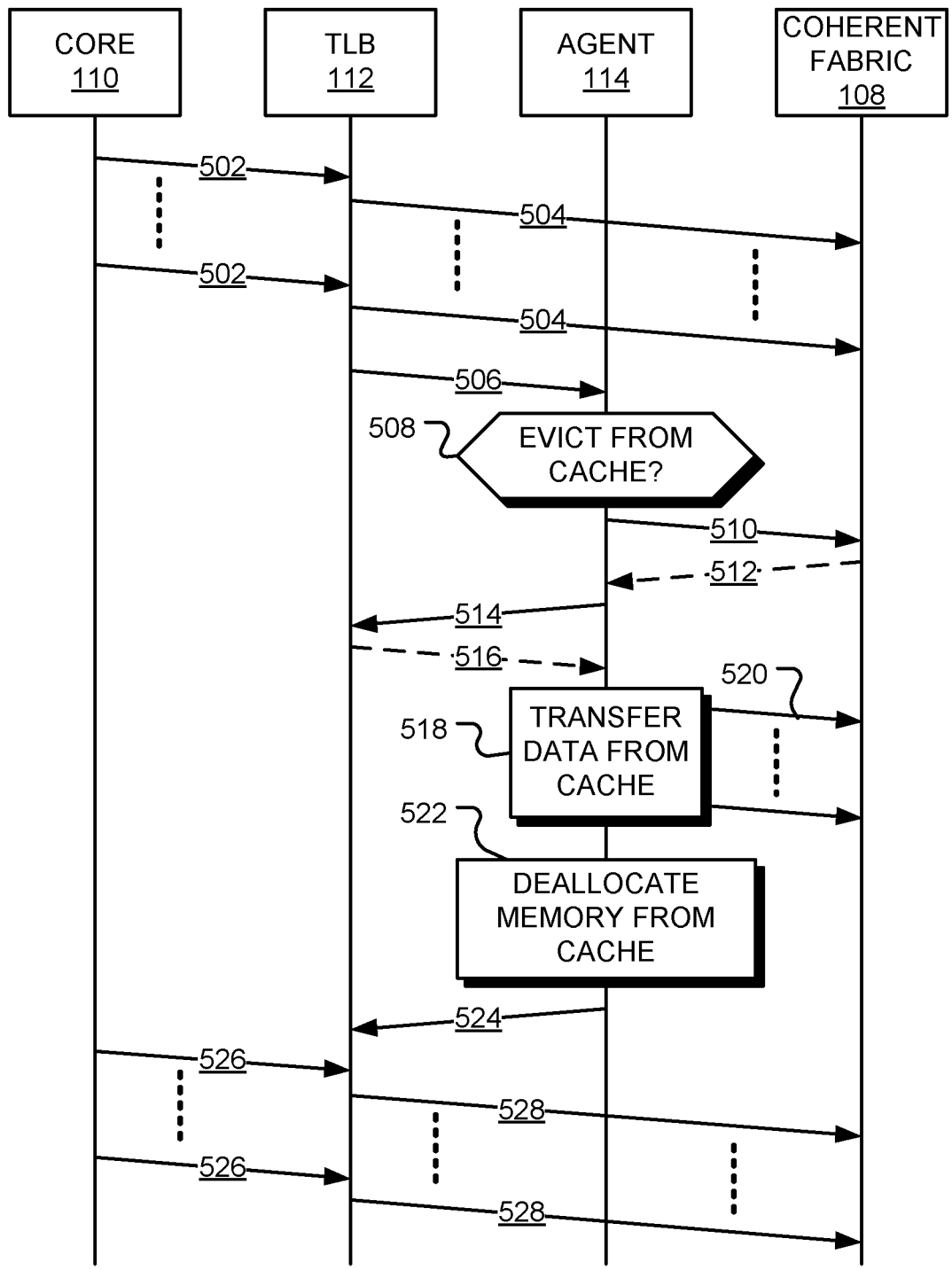
FIG. 5 is a further signal flow chart of a method for managing multiple memory pools in a data processing system, in accordance with some embodiments of the disclosure.

FIG. 5 is a further signal flow chart 500 of a method for managing multiple memory pools in a data processing system, in accordance with some embodiments. In this example, data is evicted from a DRAM cache second memory. Core 110 issues message access requests 502. A virtual address to physical address translation is performed by TLB 112 and a corresponding request 504 is passed to the coherent interconnect fabric 108. Initially, data are located in the DRAM cache. The access frequency counters, maintained in the TLB, are passed to the caching agent 114 in message 506. The counters may indicate, for example, the number of times an address has been accessed in a previous time interval. At 508, caching agent 114 determines if data should be evicted from the cache. Data may be evicted, for example, if has been accessed infrequently during the previous time interval. The shadow-address table, stored in DRAM for example, is accessed and updated via message 510. The entry in shadow-address table may be cleared to signify that the page is no longer cached in the DRAM.

Response message 512 may indicate, to the caching agent, the associated region in the primary memory. In this example, the table is accessed via coherent interconnect fabric 108, but the shadow-address table may be stored locally or accessed by some other means in other embodiments. Message 514 is sent by caching agent 114 to TLB 112 to update the TLB to indicate that a transfer is in progress. The TLB information, in all TLBs, is updated so that the presence of the data in DRAM is no longer indicated. Response 516 to message 514 may be provided by the TLB as an acknowledgement of message 514.

All dirty data in the region associated with the address is made persistent in the SCM.

At 518, the data is transferred from the cache back to the primary memory by sending one or more messages 520 to coherent interconnect fabric 108. All of the data may be transferred, or only data that may have been modified may be transferred. Since the caching manager might want to re-use the storage in DRAM for other pages, evictions from the DRAM cache will cause evictions from all on-chip caches, and all on-chip cached data for that memory block should be flushed. The memory may then be deallocated from the DRAM cache at 522. Caching agent 114 sends message 524 to TLB 112 to indicate that the transfer is complete. For example, if accesses were disabled during the transfer, they may be enabled in response to message 524. Subsequent memory access requests 526 by core 110 are directed by TLB 112 to the primary memory in requests 528 to coherent interconnect fabric 108.

Figure 6:
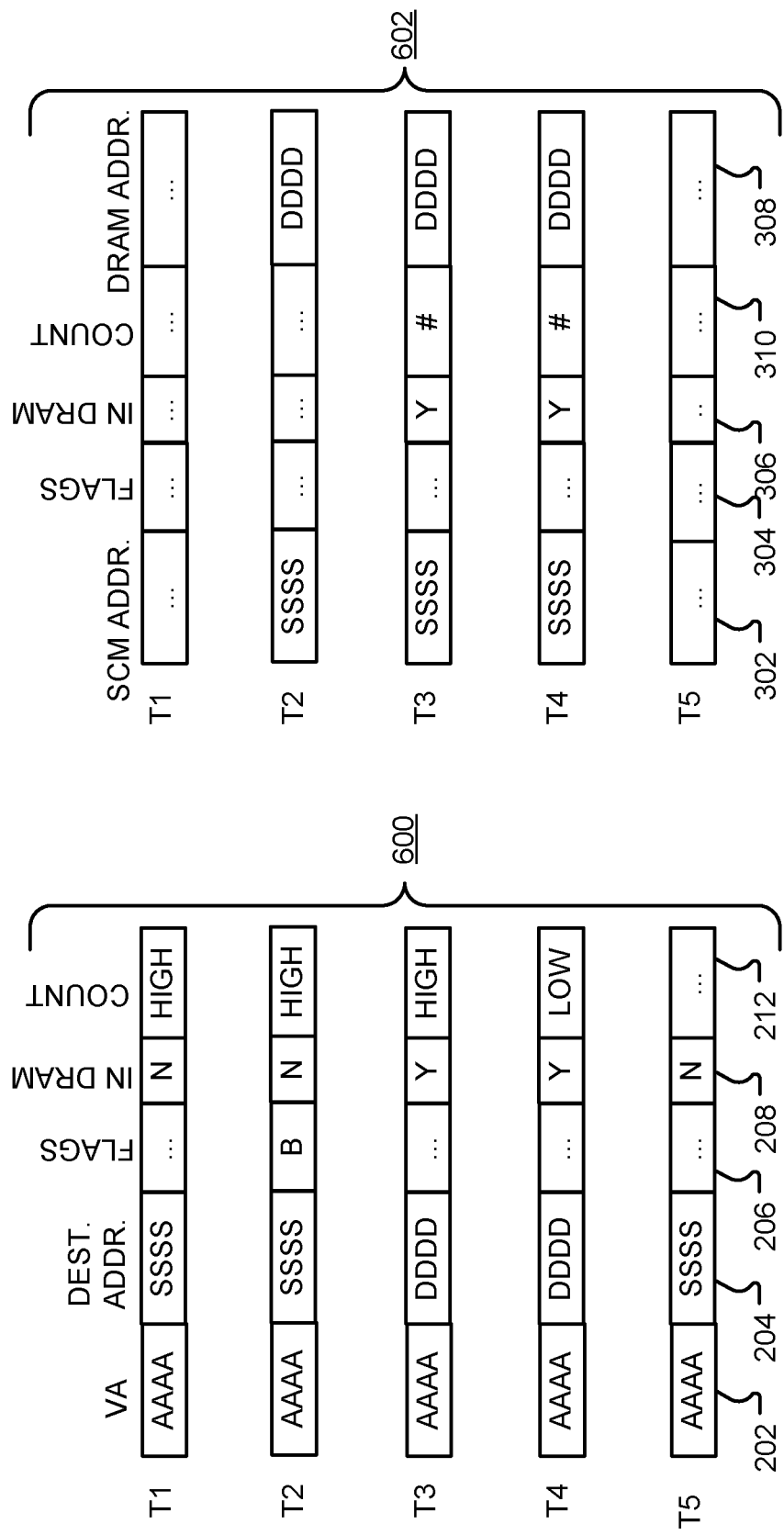
FIG. 6 shows example address tables, in accordance with certain embodiments of the disclosure.

FIG. 6 shows examples address tables, in accordance with certain embodiments. Element 600 shows one row of a translation lookaside buffer (TLB) table at times T1, T2, T3, T4 and T5. Element 602 shows one row of a shadow-address table, also at times T1, T2, T3, T4 and T5. At time T1, the row 600 of the TLB table has been filled to enable rapid translation between a virtual memory address and a physical memory address. The virtual memory address ('AAAA') is stored in column entry 202 of the TLB table and the corresponding physical address ('SSSS') is stored in column entry 204. The physical address is the destination address for memory accesses. As indicated by entry 'N' in column 208, the data has not yet been moved to the secondary memory. Thus, the destination address is an address in the primary memory (e.g. SCM). Also at time T1, the row in shadow-address table 602 is empty, since the data is stored only in the primary memory (SCM in this example) at time T1.

Column entry 212 records an access frequency counter. In the example shown, the entry indicates that a memory region with virtual address 'AAAA' has a high access frequency. This information is communicated to the caching manager and, as discussed above with reference to FIG. 4, the caching manager, at time T2, causes the data to be copied from the primary memory to the secondary memory. Access to the data being copied is controlled while the transfer is in progress. For example, in one embodiment, a flag in column entry 206 may be set to indicate that access to the memory is blocked, as indicated by the entry 'B' in column 206 in FIG. 6. A memory region is allocated with address 'DDDD' in the secondary memory (DRAM cache in this example) and column entries 302 and 308 in the shadow-address table are updated to indicate the relationship between the first memory region with address 'AAAA' and the second memory region with address 'DDDD'.

At time T3, the transfer is complete. The blocking flag in column entry 206 is cleared, the destination address is set to the address 'DDDD' of the memory region in the secondary memory, the 'IN DRAM' flag in column entry 208 is asserted (as indicated by the 'Y' entry). If the primary and secondary memories have non-overlapping address spaces, the 'IN DRAM' column may not be required. However, if no shadow-address table is used, both the primary address ('AAAA') and the secondary address ('DDDD') may be stored in the TLB table and the 'IN DRAM' column is included in the TLB table. Also at time T3, the shadow address table is updated as shown.

If, at a later time T4, the access frequency counter in column entry 212 becomes low, the data may be evicted from the secondary memory (DRAM), as described above with reference to FIG. 5, for example. Access to the region may be blocked while the data is being evicted and the primary memory updated. After the data has been evicted, at time T5, the TLB is updated to indicate that the data is again stored in the primary memory. Thus, the destination address in column entry 204 is set to the primary address 'AAAA' and the 'IN DRAM' column entry 208 is cleared as indicated by the entry 'N'. In an alternative embodiment, the line may also be removed from the TLB until a future 'fill' operation. At time T5, the row 602 of the shadow-address table is updated to remove the record of the mapping.

In other circumstances, the entry may be evicted from the TLB, in which case the row of the TLB is cleared or replaced. However, the data may remain in the secondary memory, as shown at time T4. In one embodiment, a flag is stored denoting whether a page is stored in the DRAM cache in the leaf entry in the page table structure. During a subsequent TLB fill operation, the flag indicates that the caching agent should be instructed to fetch the proper address from the shadow-address table in DRAM. In a further embodiment, the flag is stored in column entry 306 rather than in the page table structure. A TLB fill operation may check whether the final address of the page that is about to be inserted in the TLB is already present in the DRAM cache. This is achieved by the caching manager by looking up the shadow-address table in the DRAM.

Design Tradeoffs/Decisions

In the embodiments described above, memory is managed in page-sized chunks. However, smaller (or larger) chunks may be used without departing from the present disclosure. In a further embodiment, the flags that signal whether a region of memory is stored in DRAM can be extended to manage subsections of the page stored in each TLB entry. For instance, flags may provide information as to whether portions of the page are cached in DRAM (i.e. top or bottom half, ¼, ⅛, and so on, making it possible to cache portions of a page as little as 128 or 256 bytes). There is a design tradeoff in that extra storage is required to keep track of portions of a physical page while extra bandwidth is needed to transfer unnecessary data from SCM to DRAM.

Another design tradeoff is the complexity in adding feedback from the cache sub-system to the agent that determines whether a page (or portion of it, as discussed above) should be placed in DRAM. A more advanced feedback mechanism may use information from on-chip system-level caches to steer the DRAM/SCM caching manager towards making better decisions regarding the usefulness of caching a page in the DRAM, since the on-chip caches might already suffice in caching and filtering SCM accesses for some pages.

Lower-area/Effort Implementations

With certain restrictions, some functions of the caching manager can be implemented through hardware already present in data processing systems. In one embodiment, a DRAM caching manager could be embodied by a light-weight hypervisor or virtual-machine monitor (VMM).

When running a virtual system, a guest system is allocated virtual memory of the host system that serves as a physical memory for the guest system. A guest virtual memory address is first translated to a host virtual address and then to a physical address, so there are two levels of address translation. Hardware implementation of the second level address translation may be used to map chosen SCM pages to DRAM.

Further Embodiments

Although one objective of the caching manager is to improve performance for memory accesses, the caching manager may also be used to implement replacement policies that limit SCM wear-out and enable memory compression, encryption and deduplication for data stored in the persistent memory. The methods described here are designed to be transparent to software (both application and operating system), although this scheme could also expose an application programming interface (API) to give the operating system control over data placement and management. Additionally, the operating system can also provide hints on data placement that the hardware can use to make intelligent decisions.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

The caching manager may be implemented in an integrated circuit. The circuit may be defined be a set of instructions of Hardware Description Language (HDL) instructions, which may be stored in a non-transient computer readable medium, for example. The instructions may be distributed via the computer readable medium or via other means such as a wired or wireless network. The instructions may be used to control manufacture or design of the integrated circuit, and may be combined with other instructions.

Although illustrative embodiments of the disclosure have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A data processing system comprising:
a caching manager; and
a translation lookaside buffer (TLB);
where the caching manager comprises hardware configured to:
transfer data between a first memory and a second memory, where the first and second memories are accessible by a processing device and where the first memory and second memories are different types of memory;
monitor accesses to the first memory by the processing device; and
transfer data in a frequently accessed region of the first memory to the second memory, where the frequently accessed region is located at a first memory address in the first memory and the data transferred to the second memory is located at a second memory address in the second memory;
where the TLB is accessible by the processing device and configured to store:
a virtual address of the data and a corresponding address in the first memory when the data has not been transferred to the second memory; and
a virtual address of the data and a corresponding address in the second memory when the data has been transferred to the second memory, and
where the caching manager is further configured to record a mapping between the first memory address and the second memory address in a shadow-address table.

2. The data processing system of claim 1, where the TLB is further configured to store a flag that indicates when data at a first virtual address is located in the second memory.

3. The data processing system of claim 1, where the TLB is further configured to store a flag that indicates when the data is being transferred to or evicted from the second memory.

4. The data processing system of claim 1, where the TLB is further configured to block access to the data when the data is being transferred to or evicted from the second memory.

5. The data processing system of claim 1, where the TLB is further configured to store a counter that indicates a number of accesses by the processing device to a memory region corresponding to a virtual address and where a value of the counter is used to determine the frequently accessed region of the first memory.

6. The data processing system of claim 1, further comprising an interconnect fabric configured to couple between the first memory, the second memory and the processing device, where the interconnect fabric and caching manager are formed in an integrated circuit.

7. The data processing system of claim 1, wherein the first memory comprises a storage class memory (SCM) and the second memory comprises a volatile memory.

8. The data processing system of claim 1, further comprising one or more second caching managers.

9. A non-transient computer readable medium containing instructions of a hardware description language representative of the data processing system of claim 1.

10. A non-transient computer readable medium containing a netlist representative of the data processing system of claim 1.

11. A data processing system comprising:
a caching manager; and
a translation lookaside buffer (TLB);
where the caching manager comprises hardware configured to:
transfer data between a first memory and a second memory, where the first and second memories are accessible by a processing device;
monitor accesses to the first memory by the processing device; and transfer data in a frequently accessed region of the first memory to the second memory, where the frequently accessed region is located at a first memory address in the first memory and the data transferred to the second memory is located at a second memory address in second first memory; and where the TLB is accessible by the processing device and configured to store:
   a virtual address of the data and a corresponding address in the first memory when the data has not been transferred to the second memory; and
   a virtual address of the data and a corresponding address in the second memory when the data has been transferred to the second memory, where the caching manager is further configured to record a mapping between the first memory address and the second memory address in a shadow-address table, and where the shadow-address table is stored in the second memory.

12. A method for memory management in a data processing system having at least a first memory and a second memory, the method comprising:
   accessing data at a virtual memory address, where the virtual memory address is associated with a first region of the first memory, where accessing data at the virtual memory address comprises translating the virtual memory address to a physical memory address in a translation look-aside buffer (TLB);
   monitoring memory accesses to the virtual memory address;
   transferring data from the first region of the first memory to a second region of the second memory and updating the physical memory address in the TLB to correspond to the second region of the second memory when the virtual memory address is accessed frequently; and
   recording a mapping between the first region and the second region in a shadow-address table.

13. The method of claim 12, further comprising:
   evicting data from the second region of the second memory to the first region of the first memory and updating the physical memory address in the TLB to correspond to the first region of the first memory when the virtual memory address is accessed infrequently.

14. The method of claim 12, where said accessing data at the virtual memory address comprises updating a counter associated with the virtual memory address stored in the TLB.

15. The method of claim 12, where said accessing data at the virtual memory address is blocked when transferring data from the first region of the first memory to the second region of the second memory.

16. The method of claim 12, where said monitoring memory accesses to the virtual memory address comprises updating an access counter stored in the TLB.

17. A method for memory management in a data processing system having at least a first memory and a second memory, the method comprising:
   accessing data at a virtual memory address, where the virtual memory address is associated with a first region of the first memory, where accessing data at the virtual memory address comprises translating the virtual memory address to a physical memory address in a translation look-aside buffer (TLB);
   monitoring memory accesses to the virtual memory address;
   transferring data from the first region of the first memory to a second region of the second memory and updating the physical memory address in the TLB to correspond to the second region of the second memory when the virtual memory address is accessed frequently; and
   recording a mapping between the first region and the second region in a shadow-address table,
further comprising accessing the shadow-address table to determine if the TLB should be filled from the first memory or from the second memory.

18. The method of claim 17, where said recording the mapping between the first region and the second region in the shadow-address table comprises updating a table stored in the second memory.

* * * * *